US007374656B2

(12) United States Patent
Elgressy

(10) Patent No.: US 7,374,656 B2
(45) Date of Patent: May 20, 2008

(54) **COMBINED ELECTROCHEMICAL SYSTEM FOR SCALE TREATMENT AND ERADICATING *LEGIONELLA PNEUMOPHILA* BACTERIA IN WATER SUPPLY SYSTEMS**

(76) Inventor: Gabby Elgressy, 16 Shechterman St., Netanya 42379 (IL)

( * ) Notice: Subject to any disclaimer, the term of this patent is extended or adjusted under 35 U.S.C. 154(b) by 219 days.

(21) Appl. No.: 10/520,708

(22) PCT Filed: Aug. 10, 2003

(86) PCT No.: PCT/IL03/00662

§ 371 (c)(1),
(2), (4) Date: Jan. 10, 2005

(87) PCT Pub. No.: WO2004/014806

PCT Pub. Date: Feb. 19, 2004

(65) Prior Publication Data

US 2005/0230268 A1 Oct. 20, 2005

(30) Foreign Application Priority Data

Aug. 11, 2002 (IL) ..................................... 151181

(51) Int. Cl.
*C02F 1/463* (2006.01)
*C25F 7/00* (2006.01)

(52) U.S. Cl. ...................... 205/742; 205/760; 204/272; 204/275.1

(58) Field of Classification Search ................ 205/742, 205/760; 204/275.1, 272
See application file for complete search history.

(56) References Cited

U.S. PATENT DOCUMENTS

| | | | | |
|---|---|---|---|---|
| 2,530,524 | A * | 11/1950 | Hlavin | 204/196.28 |
| 6,346,197 | B1 * | 2/2002 | Stephenson et al. | 210/704 |
| 6,800,207 | B2 * | 10/2004 | Holt et al. | 210/748 |
| 2004/0251213 | A1 * | 12/2004 | Bradley | 210/748 |

* cited by examiner

*Primary Examiner*—Arun S. Phasge
(74) *Attorney, Agent, or Firm*—Mark M. Friedman Ltd

(57) ABSTRACT

A combined electrochemical system for scale treatment and eradicating bacteria in water supply systems having: (a) a first electro-chemical cell including: (i) a first metallic tank for receiving a water supply and forming a cathode of the first electro-chemical cell, and (ii) a first anode, disposed within the first tank; (b) a second electro-chemical cell including: (i) a second metallic tank for receiving an effluent from the first tank and forming a cathode of the second electro-chemical cell, and (ii) a second anode, disposed within the second tank; and (c) a DC electrical supply source operatively connected to the first and the second cells, wherein the first electro-chemical cell is operative for trapping bacteria in a colloid-like structure, and the second electro-chemical cell is operative for producing a pH above 12 near the walls of the second tank, so as to form a bacteria-containing precipitate on the walls of the second tank, thereby removing the bacteria from the water supply.

16 Claims, 4 Drawing Sheets

COMBINED ELECTROCHEMICAL SYSTEM FOR SCALE TREATMENT AND ERADICATING *LEGIONELLA PNEUMOPHILA* BACTERIA IN WATER SUPPLY SYSTEMS

This application draws priority from Israel Patent Application Serial No. 151181 filed Aug. 11, 2002.

FIELD AND BACKGROUND OF THE INVENTION

The present invention relates to scale treatment and eradicating bacteria in water supply systems, and, in particular, to an efficient treatment of scale and eradicating bacteria in water systems, in general, and *Legionella pneumophila*, in particular.

Various systems for preventing scale crystallization and precipitation in cooling towers and in hot and cold water systems have been installed in or outside the systems. Substantially, these systems prevent the crystallization and precipitation of scale by leaving the scale substances as suspended colloids.

For generations, many scale systems and devices have been invented and used by those skilled in the art. Among these systems are the modern and efficient systems based on the "Guldager" electrolytic method.

In these systems, aluminum (or magnesium) anodes, connected to an external electrical supply source, are immersed in metallic water tanks. The water becomes alkaline with high pH values close to the wall of the tank. As a result, calcium carbonate ($CaCO_3$) precipitates and the aluminum anodes dissolve in the water as aluminum hydroxide—$Al(OH)_3$.

These prior art systems prevent, to some extent, the formation of scale, leaving the precipitate as suspended colloids and coagulants without disposing of these colloids.

A more advanced prior art system, described in Israeli Patent No. 120003 to Elgressy, is a modified "Gulager" system but with non dissolving electrodes made of, or coated with, TiNiO. This system, which will be further described hereinbelow, disposes of the scale colloids.

It is also known that water may contain many kinds of bacteria that can be dangerous to animals and human beings. Especially dangerous is *Legionella pneumophila*, which can be fatal and cause painful death, particularly to smokers and alcoholics, and to patients suffering from problems in the immune system, such as patients having steroids prescriptions, patients after transplanting of organs, AIDS patients, etc.

Hence, drinking water must be disinfected against harmful bacteria, in general, and *Legionella pneumophila*, in particular.

Water disinfection, according to the teaching of the prior art, includes treatment of the water with sodium hypochlorite (NaClO). Since sodium hypochlorite above the concentration of 0.5 ppm is toxic and harmful to human beings, water disinfection with this substance is prohibited in systems of drinking water. Occasional warming of water to 70° C. is also regarded as an alternative treatment against the *Legionella pneumophila* bacteria. However, the *Legionella pneumophila* bacteria undergo various mutations at high temperatures, making the bacteria substantially immune to high temperatures. Additionally, various metal systems, particularly galvanized systems, suffer from increased corrosion at such elevated temperatures.

To date, there is no known treatment system that combines scale removal and water disinfection.

There is therefore a recognized need for, and it would be highly advantageous to have, a method of, and a system for treating water electrochemically, and disinfecting it from bacteria, and more particularly, from *Legionella pneumophila*.

SUMMARY OF THE INVENTION

According to the teachings of the present invention there is provided an electrochemical system for scale treatment and eradicating bacteria in water supply systems, the electrochemical system including: (a) a storage tank for storing water including: (i) at least a first inlet for introducing the water to the tank, the first inlet having a turbulence-providing mechanism for promoting turbulence and suspending solids in a lower region of the tank, and (ii) at least a first outlet for discharging the water from the tank; (b) an electrochemical cell including: (i) a metallic tank for receiving an effluent from the storage tank, the metallic tank forming a cathode of the electrochemical cell, and (ii) at least one anode, disposed within the metallic tank; and (c) a DC electrical supply source operatively connected to the electrochemical cell, wherein the electrochemical cell is operative to reduce activity of bacteria in the effluent.

According to another aspect of the present invention there is provided a combined electrochemical system for scale treatment and eradicating bacteria in water supply systems including: (a) a first electrochemical cell including: (i) a first metallic tank for receiving a water supply, the tank forming a cathode of the first electrochemical cell, and (ii) a first anode, disposed within the tank; (b) a second electrochemical cell including: (i) a second metallic tank for receiving an effluent from the first tank, the second tank forming a cathode of the second electrochemical cell, and (ii) a second anode, disposed within the second tank; and (c) a DC electrical supply source operatively connected to the first cell and the second cell, the first electrochemical cell operative for trapping bacteria in a colloid-like structure, the second electrochemical cell operative for producing a pH above 12 near walls of the second tank, so as to form a bacteria-containing precipitate on the walls of the second tank, thereby removing the bacteria from the effluent.

According to yet another aspect of the present invention there is provided an electrochemical method of scale treatment and eradicating bacteria in water supply systems including the steps of: (a) providing a system including: (i) a first electro-chemical cell including: (I) a first metallic tank for receiving a water supply, the tank forming a cathode of the first electrochemical cell, and (II) a first anode, disposed within the tank; (ii) a second electrochemical cell including: (I) a second metallic tank for receiving an effluent from the first tank, the second tank forming a cathode of the second electrochemical cell, and (II) a second anode, disposed within the second tank; (b) supplying electrical power to the cells by means of a DC electrical supply source; (c) trapping bacteria in a colloid-like structure in the first tank, and (d) precipitating a precipitate in the second tank, the precipitate containing the bacteria.

According to further features in the described preferred embodiments, the electrochemical cell is operative for producing a pH above 12 near walls of the metallic tank, so as to form a bacteria-containing precipitate on the walls of the metallic tank, thereby removing the bacteria from the effluent.

According to still further features in the described preferred embodiments, the turbulence-providing mechanism is driven by the water introduced to the storage tank via the first inlet.

According to still further features in the described preferred embodiments, the turbulence-providing mechanism directs the water into the lower region of the storage tank water so as to promote turbulence and suspend solids in the lower region.

According to still further features in the described preferred embodiments, the electrochemical system further includes: (d) a pumping mechanism for pumping an aqueous effluent stream from the electrochemical cell through a heat-exchange device, so as to heat the stream and thereby further reduce the activity of the bacteria.

According to still further features in the described preferred embodiments, the bacteria include *Legionella pneumophila.*

According to still further features in the described preferred embodiments, the anode includes a material selected from the group consisting of an alloy of TiNiO and a metal coated by an alloy of TiNiO.

According to still further features in the described preferred embodiments, the electrochemical system further includes: (iii) an elastic scraper, the scraper operative for scraping the walls of the metallic tank, so as to remove the bacteria-containing precipitate from the walls.

According to still further features in the described preferred embodiments, the first anode is made of a material selected from the group consisting of aluminum, magnesium, and zinc.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
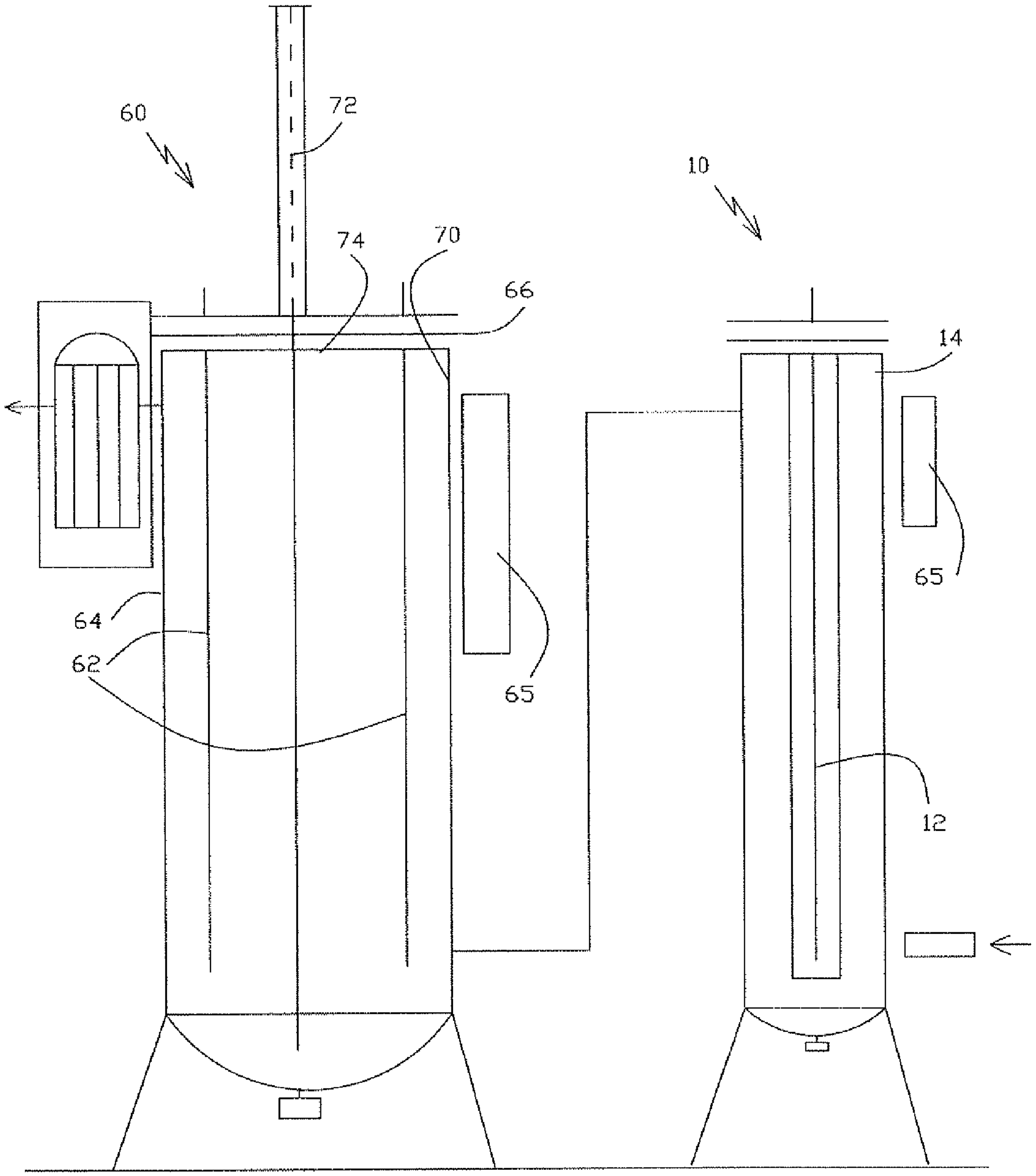
FIG. 1 is a schematic cross sectional view of a combined electrochemical system for scale treatment and eradication of *Legionella pneumophila* bacteria in a water supply system, according to the present invention.

The present invention is a combined electrochemical system for, and a method of, scale treatment and water disinfection.

The principles and operation of the system and method according to the present invention may be better understood with reference to the drawing and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

Referring now to the drawing, FIG. 1 is a schematic cross sectional view of a combined electrochemical system for scale treatment and eradication of *Legionella pneumophila* bacteria in water supply systems.

The combined electrochemical system includes two electrical cells: a coagulating cell 10 and a scale treatment cell 60.

Coagulating cell 10 includes an anode 12, made of any of various alloys of aluminum, inserted in a metallic column or tank 14. Typically, anode 12 contains magnesium, zinc and various additional metals, in addition to aluminum. After connecting anode 12 to a DC power supply (not shown), the water close to the wall of column 14 becomes alkaline (typically, pH values of 9.5 to 10), and the water close to the anode becomes acidic. As a result, anode 12 slowly dissolves, forming colloids and coagulants of metal salts that envelope and trap the bacteria cells.

The water, with all the colloids and coagulants, flows from the column to scale treatment cell 60, which is a modified "Guldager" electrolytic system. Scale treatment cell 60 includes a plurality of anodes 62, typically two, immersed in a second metallic water tank 64. Anodes 62 are typically made of, or coated with, a TiNiO alloy. Preferably, anodes 62 are vertically attached to a cover 66 of tank 64, and almost reach the bottom thereof. Contrary to the aluminum anodes of the "Guldager" prior art system, high electrical currents may be passed through anodes 62 and to water tank 64, without damage to or dissolution of anodes 62, and without the resulting contamination of the water with metal ions emanating from anodes 62.

After connecting at least one power supply to the system, the water around anodes 62 becomes acidic, releasing chlorine from the chloride salts that are dissolved in the water and free oxygen radicals from the water, while the water close to the cell's walls attains high pH values (typically, 12 to 14). Consequently, various carbonates and aluminum oxides, including the occluded *Legionella pneumophila* bacteria cells, precipitate on the walls of tank (cathode) 64.

Second tank 64 preferably includes a scraper 70 that enables a mechanical cleaning of scale from the inner walls. Typically, the scraper is made of rubber or any other elastomeric material like neoprene, butyl rubber or polybutadiene. The scraper 70 is designed and configured with openings that enable the installment of the anodes, attached to the cover, and also enable free movement of the scraper. Upon operation of scraper 70, scale particles are loosened from the inner walls and freely drop to the bottom of the tank. The bottom is equipped with a drain valve for disposing of the loose scale.

For rinsing the water tank after operating the piston and draining loose scale, a rinsing water inlet valve and a rinsing water outlet valve are installed at the upper part of the tank close to the tank cover.

When the thickness of the precipitated salts reach about 0.3-0.5 cm, the electrical resistance increases and scale cleaning is necessary. Whenever scale cleaning is desired or needed, the operating water system is closed and scraper 70 is operated. Scraper 70 moves slowly downwards, scraping the scale from the inner wall of second tank 64. When scraper 70 reaches its lowest position, the draining valve is opened and the slurry of loose particles and water is drained out. After draining, water tank 64 is thoroughly rinsed by opening the water inlet valve and water outlet valve until clear water comes out. After rinsing tank 64, scraper 70 is raised back to its normal place.

The cleaning process can be operated manually or, preferable, by an automatic, pneumatic or electrical, pre-programmed system according to the electrical resistance or by a timer. FIG. 1 shows, by way of example, a piston mechanism 72 for driving scraper 70. Scraper 70 includes a plate 74 that is operatively connected to piston mechanism 72. Plate 74 should not be in electrical contact with anodes 62, and typically has circular openings (not shown) in the area of anodes 62, such that anodes 62 are disposed concentrically within the openings.

As it will be apparent to those skilled in the art, the cross section cut of the water tank and the piston should not necessarily be round and may also be square or rectangular.

Figure 2A:
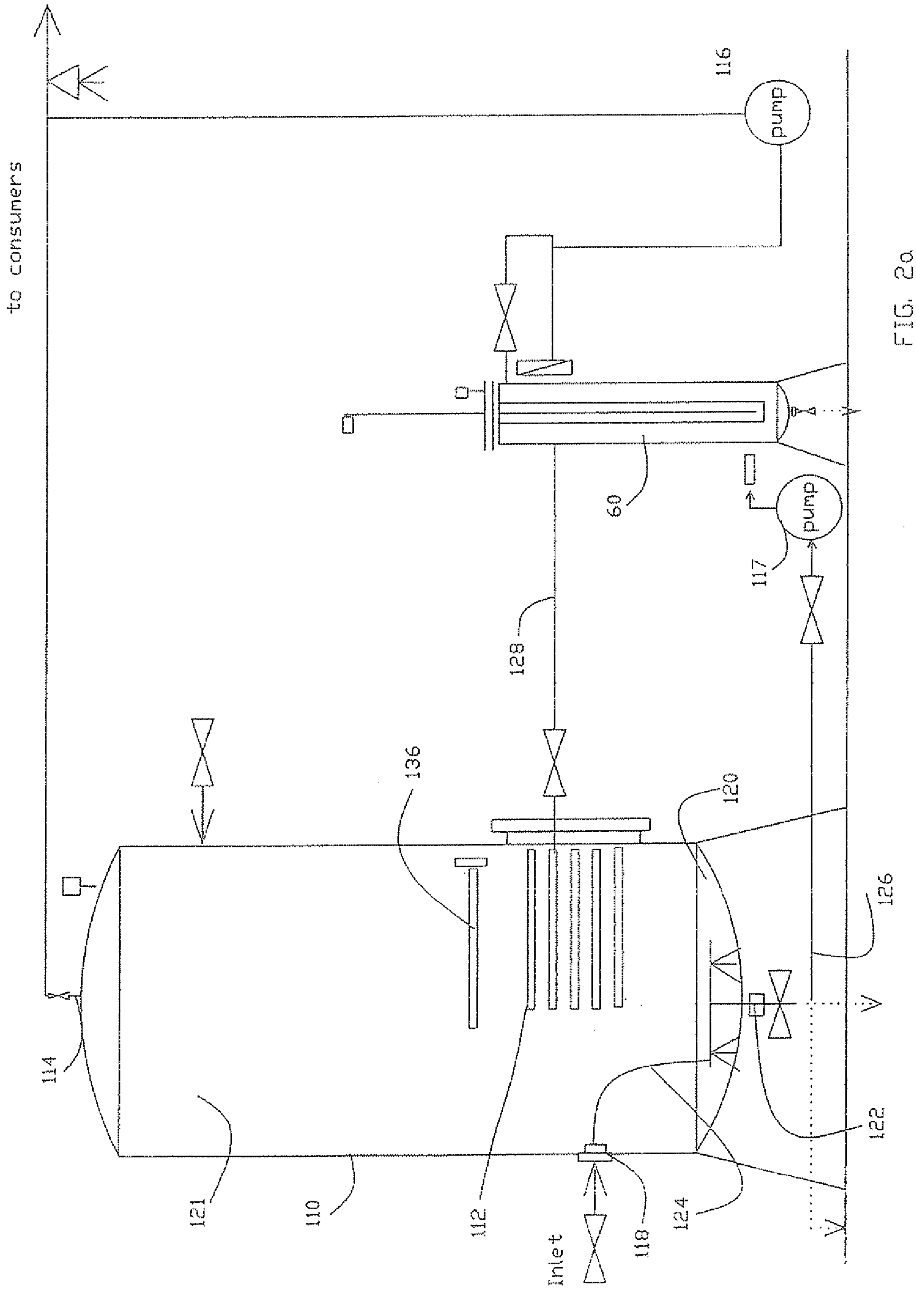
FIG. 2*a* is a schematic drawing of another preferred embodiment of the present invention, as applied to a hot water supply system having a storage tank having an internal heat exchanger.

FIG. 2*a* is a schematic drawing of another preferred embodiment of the present invention, as applied to a hot water supply system having a hot water storage tank 110 having an internal heat exchanger 112. The outlet 114 for discharging hot water from hot water tank 110 is almost invariably disposed near the top of tank 110, where the water temperature is hottest. The water is circulated to the consumers, by means of a pump 116, and the unused water is returned to hot water storage tank 110. Make-up water is introduced to tank 110 via inlet 118.

The lower region 120 of tank 110, situated below inlet 118, is substantially stagnant in prior-art storage tanks. It has been observed by the inventor that the stagnant regime, coupled with cooler temperatures (with respect to the upper region 121 of the tank 110), and coupled with the settling of dust, dirt, rust, and debris in lower region 120, greatly promote the breeding of microorganisms, and of *Legionella pneumophila* in particular. Moreover, it has been observed by the inventor that even the suction action of pump 117 drawing water from cold water discharge outlet 122 is insufficient to withdraw the bacteria-laden and debris-laden water near the bottom of tank 110, and particularly the contaminated water situated near the circumference of the bottom.

Hence, in a preferred embodiment of the present invention, inlet 118 is provided with a turbulence-providing mechanism 124 for providing turbulence to lower region 120, so as to stir up all the stagnant zones in lower region 120. This serves, in and of itself, to depress the growth of micro-organisms in lower region 120. Moreover, stream 126 is subsequently introduced into scale treatment cell 60, which has several effective mechanisms for destroying bacteria, as described in detail hereinabove. Finally, the effluent 128 from scale treatment cell 60 is returned to hot water tank 110, preferably in the vicinity of internal heat exchanger 112. The high temperatures and turbulence that characterize upper region 121 further depress microbial activity.

Optionally, hot water tank 110 contains a sacrificial anode 136.

Figure 2B:
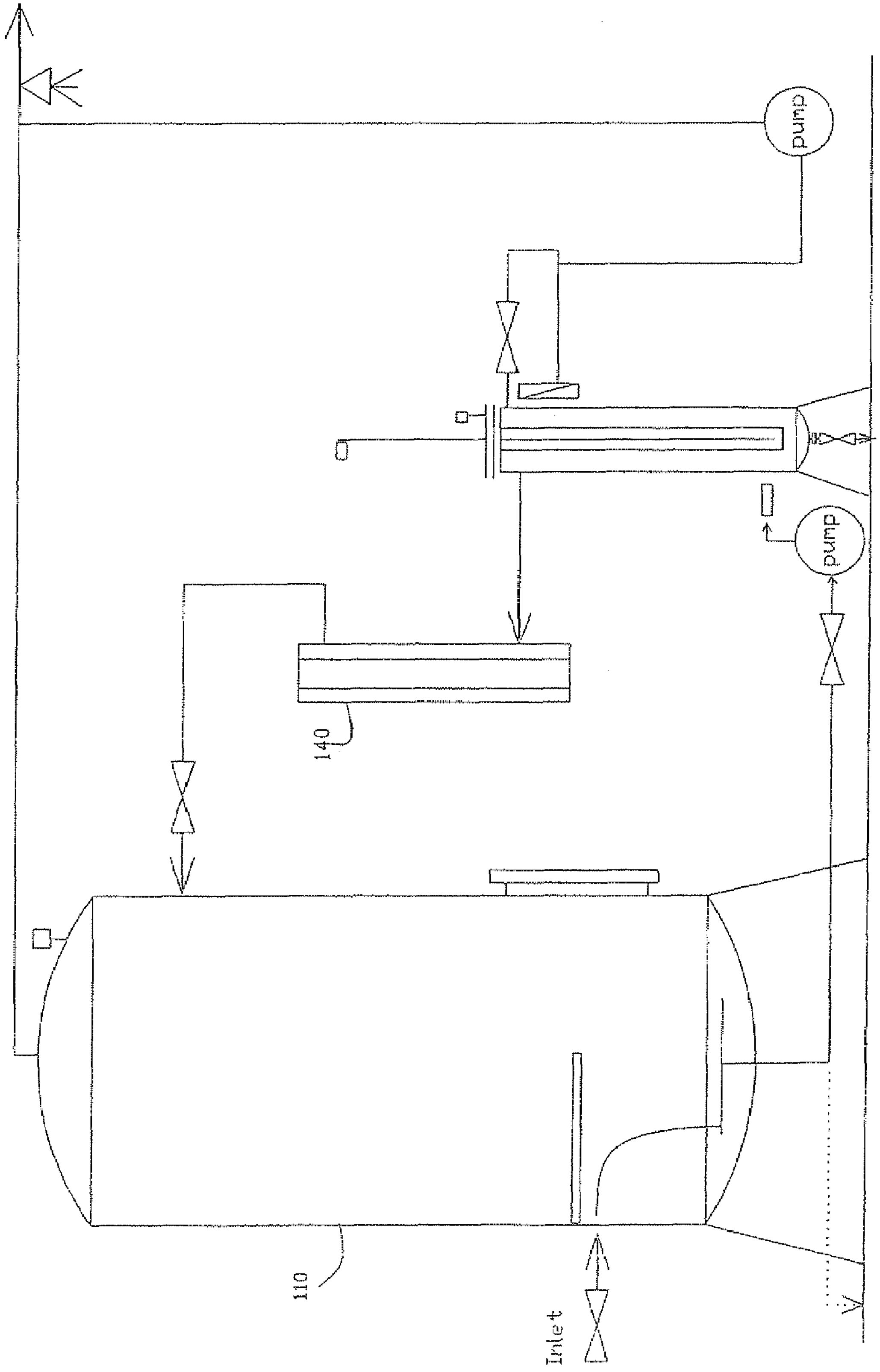
FIG. 2*b* is a schematic drawing of another preferred embodiment of the present invention, as applied to a hot water supply system having a storage tank having an external heat exchanger.

FIG. 2*b* is a schematic drawing of another preferred embodiment of the present invention, in which the heat exchanger for transferring heat to the water in hot water tank 110 is an external heat exchanger 140.

Figure 3:
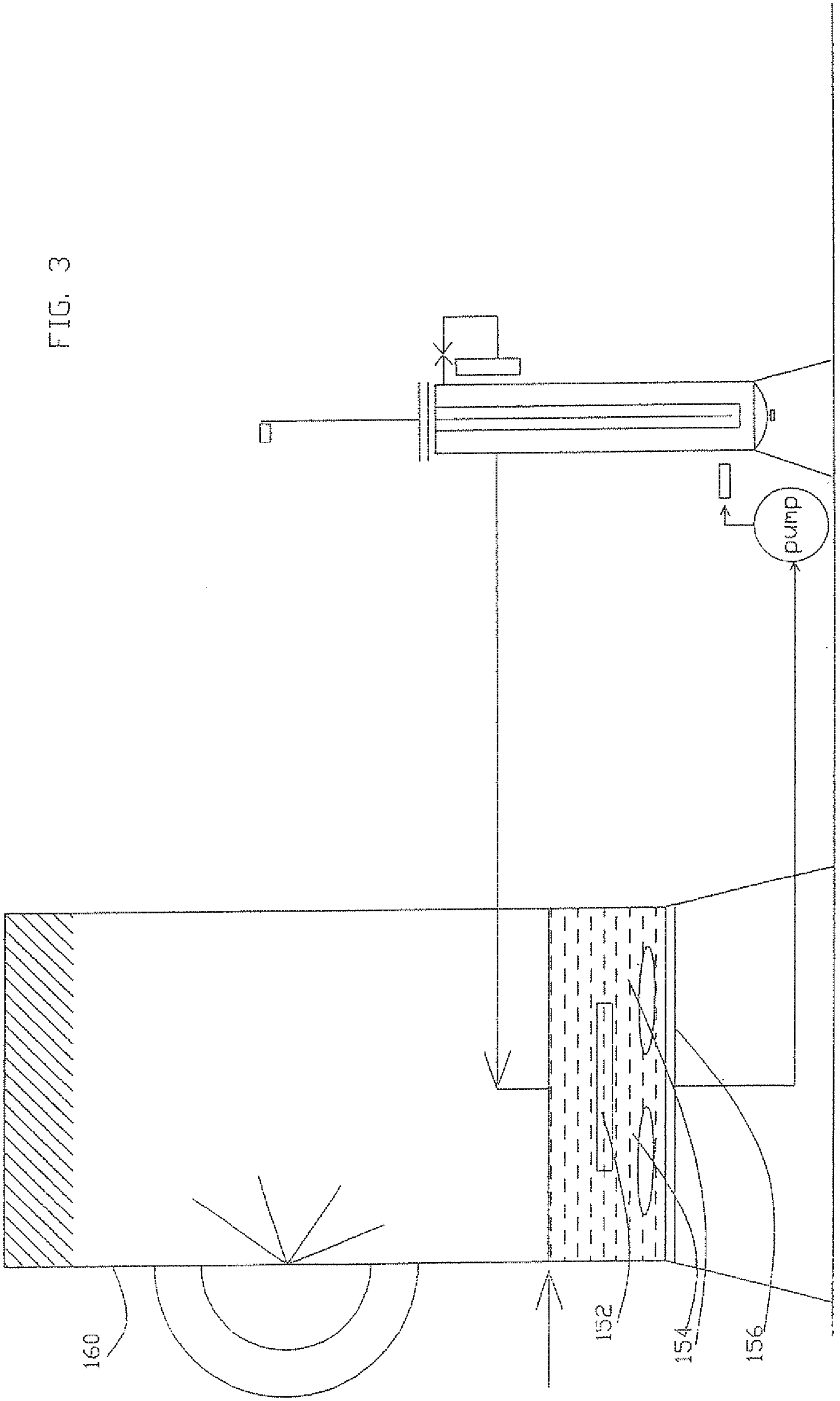
FIG. 3 is a schematic drawing of another preferred embodiment of the present invention, as applied to a cold water supply or cooling tower system.

FIG. 3 is a schematic drawing of another preferred embodiment of the present invention, as applied to a cold water supply or cooling tower system. Turbulence-providing mechanism 152 has a plurality of small holes or nozzles 154, preferably disposed towards the bottom wall 156 of tank or cooling tower 160, for achieving a heightened turbulent effect for a given water pressure.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A combined electrochemical system for scale treatment and eradicating bacteria in water supply systems comprising:

(a) a first electrochemical cell including:
   (i) a first tank for receiving a water supply;
   (ii) a first anode, disposed within said tank, and
   (iii) a first cathode, associated with said anode;
(b) a second electrochemical cell including:
   (i) a second tank for receiving an effluent from said first tank, said second tank being a metallic tank, said second electrochemical cell adapted such that said second tank forms a second cathode of said second electrochemical cell, and
   (ii) a second anode, disposed within said second tank, and
(c) a DC electrical supply source operatively connected to said first cell and said second cell, said first electrochemical cell operative for trapping bacteria in a colloid-like structure, said second electrochemical cell operative for producing a pH above 12 near walls of said second tank, so as to form a bacteria-containing precipitate on said walls of said second tank, thereby removing said bacteria from said effluent.

2. The combined electrochemical system of claim 1, wherein said first anode is made of a material selected from the group consisting of aluminum, magnesium, and zinc.

3. The combined electrochemical system of claim 1, wherein said second anode includes a material selected from the group consisting of an alloy of TiNiO and a metal coated by an alloy of TiNiO.

4. The combined electrochemical system of claim 1, wherein said second cell further includes:

(iii) an elastic scraper, said scraper operative for scraping said walls of said second tank, so as to remove said bacteria-containing precipitate from said walls.

5. The combined electrochemical system of claim 1, wherein said bacteria include *Legionella pneumophila.*

6. The combined electrochemical system of claim 5, wherein said second electrochemical cell is further adapted so as to substantially eradicate said *Legionella pneumophila.*

7. The combined electrochemical system of claim 1, wherein said first electrochemical cell is adapted so as to produce a zone, within said first cell, having a pH between about 9.5 and about 10.

8. The combined electrochemical system of claim 1, wherein said anode of said second electrochemical cell is substantially non-sacrificial.

9. The combined electrochemical system of claim 1, wherein said first electrochemical cell is adapted so as to produce a zone having a mildly alkaline pH, and wherein said anode of said second electrochemical cell is substantially non-sacrificial.

10. The combined electrochemical system of claim 9, wherein said first anode is made of a material selected from the group consisting of aluminum, magnesium, and zinc.

11. The combined electrochemical system of claim 1, wherein said second electrochemical cell is further adapted so as to substantially eradicate said bacteria.

12. The combined electrochemical system of claim 1, wherein said first tank is a metallic tank, said first cell adapted such that said first tank forms a cathode of said first cell.

13. An electrochemical method of scale treatment and eradicating bacteria in water supply systems comprising the steps of:

(a) providing a system including:

(i) a first electrochemical cell including:

(I) a first tank for receiving a water supply;

(II) a first anode, disposed within said tank, and (III) a first cathode, associated with said anode, and (ii) a second electrochemical cell including:

(I) a second tank for receiving an effluent from said first tank, said second tank being a metallic tank, said second tank forming a cathode of said second electrochemical cell, and (II) a second anode, disposed within said second tank;

(b) supplying electrical power to said cells by means of a DC electrical supply source so as to deliver electrical currents between said first anode and said first cathode, and between said second anode and said second cathode;

(c) trapping bacteria in a colloid-like structure in said first tank;

(d) transferring said effluent containing said bacteria in said colloid-like structure into said second tank, and (e) precipitating a precipitate on a wall of said second tank, said precipitate containing said bacteria.

14. The combined electrochemical method of claim 13, wherein said bacteria is *Legionella pneumophila*.

15. The combined electrochemical method of claim 13, wherein said first electrochemical cell is adapted so as to produce a zone, within said first cell, having a pH between about 9.5 and about 10.

16. The combined electrochemical method of claim 13, wherein said first anode is made of a material selected from the group consisting of aluminum, magnesium, and zinc, and wherein said second anode includes a material selected from the group consisting of an alloy of TiNiO and a metal coated by an alloy of TiNiO.

* * * * *

UNITED STATES PATENT AND TRADEMARK OFFICE

CERTIFICATE OF CORRECTION

PATENT NO. : 7,374,656 B2
APPLICATION NO. : 10/520708
DATED : May 20, 2008
INVENTOR(S) : Gabby Elgressy It is certified that error appears in the above-identified patent and that said Letters Patent is hereby corrected as shown below:

Claim 5, column 6 should be corrected as follows:

Line 64: change "pneumophila." to --Pneumophila.--

Claim 6, column 6 should be corrected as follows:

Line 67: change "pneumophila." to --Pneumophila.--

Claim 14, column 8 should be corrected as follows:

Line 20: change "pneumophila." to --Pneumophila.--

Signed and Sealed this

Twenty-second Day of July, 2008

Jon W. Dudas

JON W. DUDAS
*Director of the United States Patent and Trademark Office*